Figure 1:
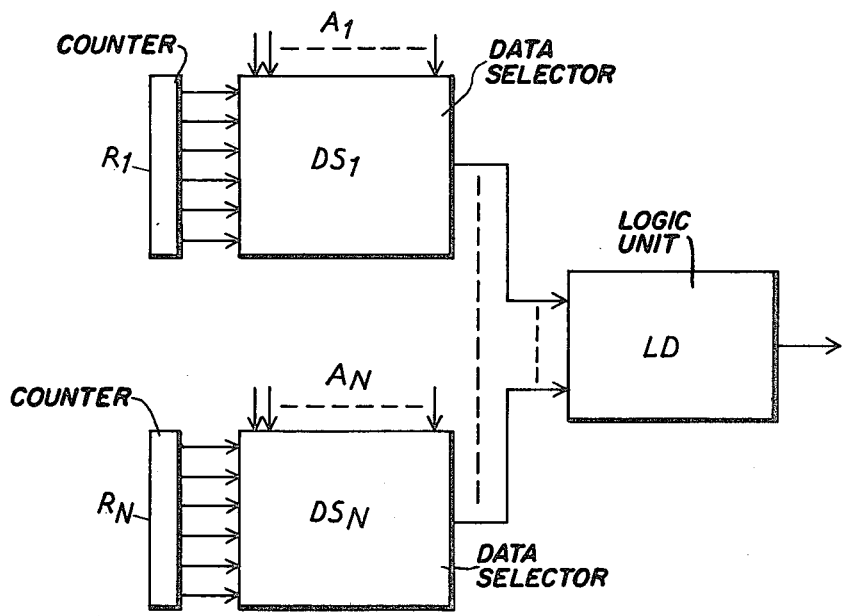

United States Patent [19]

Johansson

[11] 4,058,673

[45] Nov. 15, 1977

[54] ARRANGEMENT FOR CIPHERING AND DECIPHERING OF INFORMATION

[75] Inventor: Sven Torild Kruse Johansson, Hagersten, Sweden

[73] Assignee: Telefonaktiebolaget L M Ericsson, Stockholm, Sweden

[21] Appl. No.: 616,490

[22] Filed: Sept. 24, 1975

[30] Foreign Application Priority Data

Oct. 17, 1974 Sweden .............................. 74130873

[51] Int. Cl.² ............................................. H04L 9/04
[52] U.S. Cl. ...................................... 178/22; 331/78; 364/423; 364/717
[58] Field of Search ............................ 178/22; 331/78; 235/152

[56] References Cited

U.S. PATENT DOCUMENTS

| | | | |
|---|---|---|---|
| 3,051,783 | 8/1962 | Hell et al. ............................... | 178/22 |
| 3,506,783 | 4/1970 | Mo et al. ................................ | 178/22 |
| 3,703,727 | 6/1971 | Knowlton .............................. | 331/78 |
| 3,751,648 | 8/1973 | Wu ......................................... | 331/78 |
| 3,761,696 | 9/1973 | Russell ................................... | 331/78 |
| 3,796,830 | 3/1974 | Smith ..................................... | 178/22 |
| 3,878,331 | 4/1975 | Morgan et al. ........................ | 178/22 |
| 3,934,078 | 1/1976 | Gannett ................................. | 331/78 |

*Primary Examiner*—Howard A. Birmiel
*Attorney, Agent, or Firm*—Hane, Roberts, Spiecens & Cohen

[57] ABSTRACT

An arrangement for ciphering and deciphering comprises a number of cycle length counters. Each of the counters has a different cycle length and generates a series of bits by scanning associated memory fields containing internal-key-information. The series of bits are combined in a logical unit in order to obtain a ciphered series. The arrangement includes a plurality of memories each comprising a number of memory fields corresponding to the number of counters. Switches are arranged to select internal-key-information by selecting memory fields from different memories depending on a control device, which is operated by certain character combinations in the transmitted text on the sender side and on the receiver side of the system.

2 Claims, 4 Drawing Figures

ARRANGEMENT FOR CIPHERING AND DECIPHERING OF INFORMATION

The present invention refers to the ciphering and deciphering of messages and more particularly to apparatus in which an internal-key-information obtained by scanning N memory fields by means of different modulo counters is used in combination to produce a cipher series. The purpose of the invention is to increase the resistance of ciphering systems to crypto-analytical attack.

The rapid development of the computer field during the last few years has enabled crypto analists to treat statistically ciphered messages extremely rapidly. This fact has caused ciphering systems which previously had been considered as secure to be subject to attack by crypto analysis. Therefore the requirements for the resistance of ciphering systems against crypto-analytical attack has increased significantly.

In order to meet such increasing requirements the ciphering systems have become more and more complicated causing a considerable increase of the costs of ciphering equipments.

The object of the present invention is to provide an arrangement which can be used in connection with previously known ciphering systems and which considerably increases the resistance of such ciphering systems to crypto-analytical attack.

Figure 2:
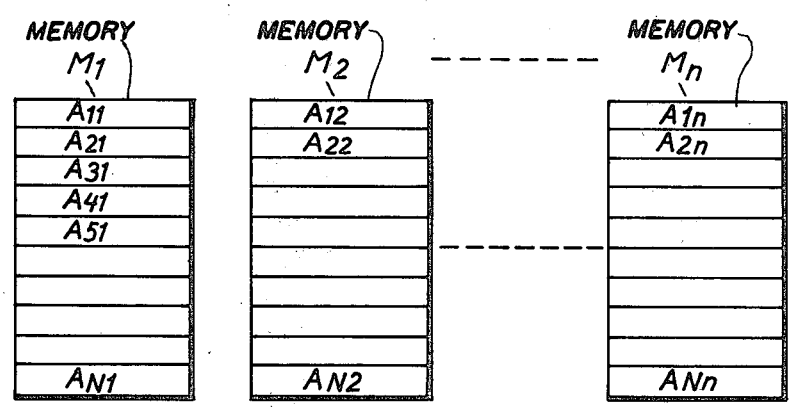
Figure 4:
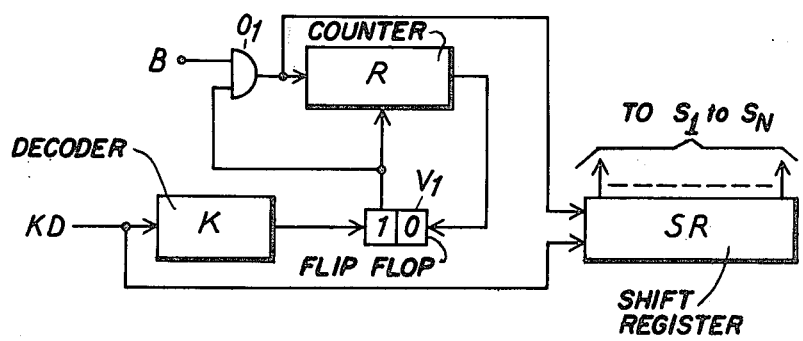
Figure 3:
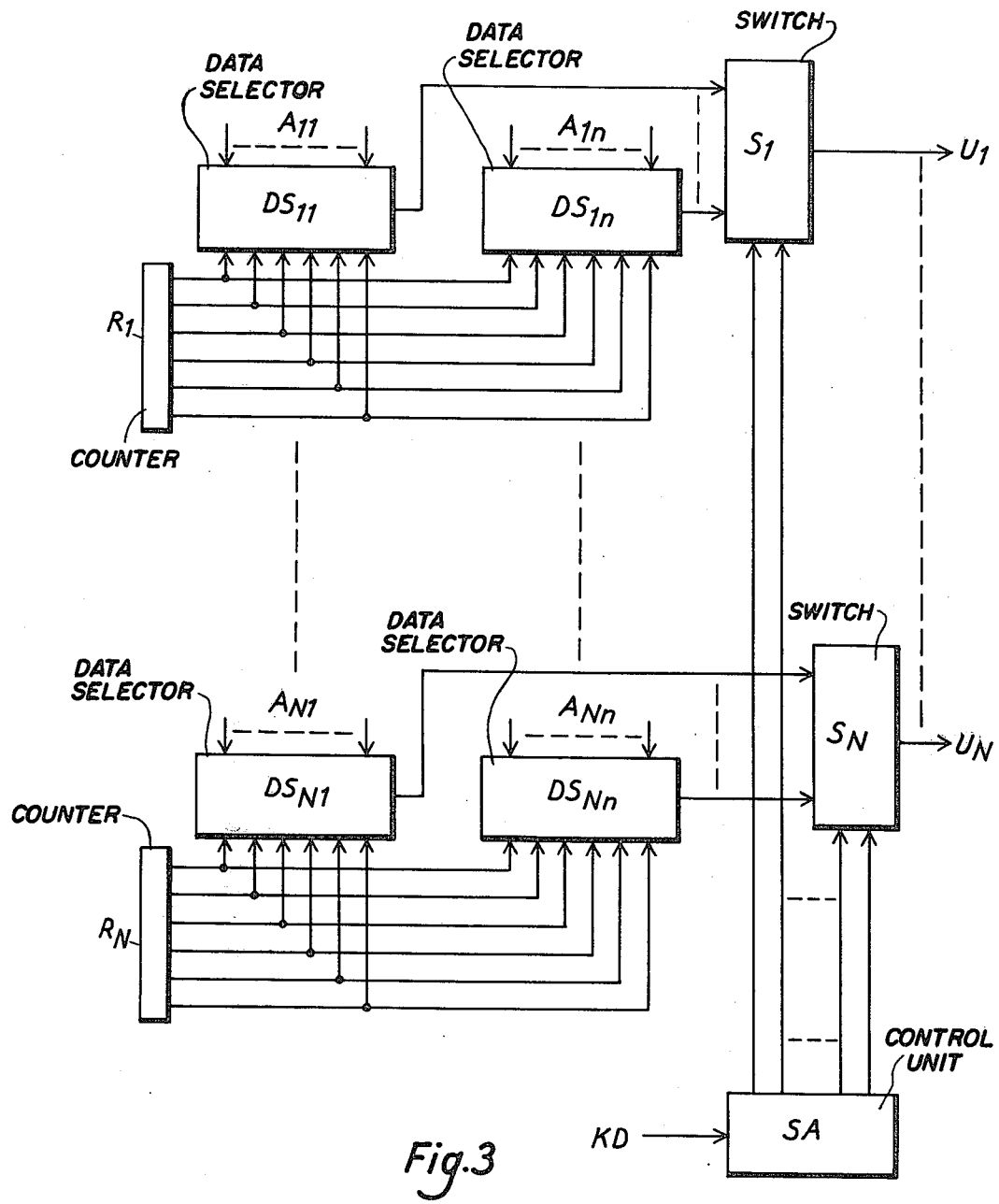

The invention will be described more in detail with reference to the accompanying drawings in which FIG. 1 shows a block diagram according to a general principle used in known ciphering systems, FIG. 2 shows a memory pattern used in arrangement according to the invention, FIG. 3 shows a block diagram of apparatus according to the invention, and FIG. 4 shows a logic diagram of the control device for use with the apparatus according to the invention.

FIG. 1 shows a general principle used in a great number of known ciphering systems. A number of circulation counters for example RCA application note ICAN-6166, Page 371, FIG. 6a $R_1 - R_N$ are connected in such way that they count up to a certain value corresponding to a cycle length after which the counting begins from zero again. They are modulo $n$ counters where $n$ is an arbitrarily chosen integer. The cycle lengths or $n$ of the different counters are selected in such manner that they are prime numbers relatively to each other, i.e. they have no common factor. The cycle length counters are stepped forward at the same rate velocity from starting positions which are defined by a so called outer-key-information. This same information is inserted both on the sender as well as on the receiver sides of the system so that the corresponding cycle length counters on the sender and the receiver side, respectively, are starting from the same start positions and then operate synchronously. The number of steps which are necessary until all the cycle length counters are in their respective start positions is equal to the product of all the cycle lengths and usually of the order of $10^{10} - 10^{15}$.

To each of the cycle length counters are connected data selectors $DS_1 - DS_N$ see for example digital integrated circuits CD 4051A, 8-channel multiplexor/demultiplexor. Data selector $DS_1$ is supplied with information from a definite field $A_1$ in a memory, for example a row on a punched card, or a certain field of an electronic memory. The other data selectors are supplied with information from other memory fields $A_2 - A_N$. The information which is supplied to the data selectors is called internal-key-information. The cycle length counters each address one bit at a time in their memory field memory field and the bits selected in this manner are supplied to a logical unit LD see U.S. Pat. No. 3,557,307. By different logical functions in the logical unit on its output, one or more bits of a cipher series are obtained which are used for ciphering or deciphering in a manner known per se. It is not necessary to describe the design of the logical unit more in detail as it can be different for different ciphering systems and the invention can be applied independently of the design of the logical unit.

FIG. 2 shows diagrammatically $n$ memories $M_1 - M_n$. These can consist for example of different electronic memories, different parts of the same electronic memory, different punched cards or punched tapes or different parts of the same punched card or punched tape, but in the following they will be designated as "different memories". Each memory is divided into different memory fields, for example memory $M_1$ in the memory fields $A_{11} - A_{N1}$. If memroy $M_1$ is apunched card the memory fields $A_{11} - A_{N1}$, may for example consist of N rows of the punched card.

The arrangement according to FIG. 3 includes N cycle length counters $R_1 - R_N$. Each counter supplies control signals to $n$ data selectors DS; $R_1$ to $DS_{11} - DS_{1n}$, $R_2$ to $DS_{21} - DS_{2n}$ and so on. On the basis of the control signals from the cycle length counters each data selector selects one bit at a time from the memory field to which it has been alloted (see FIGS. 2 and 3).

Those of the data selectors which are controlled by the same cycle length counter, for example counter $R_1$, have their outputs connected to a switch, for example $S_1$. Each switch is supplied by selecting information from a control device unit SA, the function of which will be described hereinafter. By means of selecting information supplied to the switch $S_1$ an output from a required data selector $DS_{11} - DS_{1n}$ can be selected and forwarded to the output $U_1$ of the switch $S_1$. This means that an output from a required punched card, memory or submemory can be selected and forwarded to a subsequent logical unit (LD in FIG. 1) which is also supplied by signals from outputs $U_1$ to $U_N$.

The control device SA is supplied by control data from an input KD. Control data can consist of special characters or character combinations which are suitably inserted in the clear text which is supplied for ciphering on the sender side and is received after deciphering at the receiver side. The control device SA includes coincidence circuits which respond to special character combinations occurring at the input. When such a character combination occurs the control device SA which can be a coder is set in such manner that its outputs supply a selection information corresponding to the character combination to the respective switch $S_1 - S_N$ for selecting the output of which of the data selectors $DS_{11} - DS_{1n}$ should be connected to output $U_1$, as well as the selection of the output of which data selectors $DS_{21} - DS_{2n}$ should be connected to $U_2$ output, etc.

In which manner different characters or character combinations supplied to the control device SA influence the selection information which is supplied to switches $S_1 - S_N$ and thus influence selection of a data selector, is a matter of programming. FIG. 4 shows one of a great number possible embodiments of the control unit SA which is used in ciphering as well as deciphering. To its input KD are supplied signals in clear text or deciphered signals. Element K is a decoder such as a coincidence circuit which is influenced by a predetermined character or a character combination and when this occurs it generates an output which will 1-set a flip-flop $V_1$. The latter supplies a signal to a counter R and sets it to a predetermined value which corresponds to the number of stages in a shift register SR. During the time flip-flop $V_1$ is set to 1 timing pulses are supplied from an input B via an and-circuit $O_1$ to the counter R and to the shift register SR.

The counter is stepping downwards and when its contents correspond to the value zero $V_1$ will be set to O. Upon this the and-circuit $O_1$ will be blocked, $V_1$ remains set to O and the supplying of data to the shift register ceases. The contents of the shift register SR are used for giving selecting information to the switches $S_1 - S_N$. The quantity of information which follows the special character or character combination detected by the coincidence circuit K determines the length of the shift register SR and the number of possibilities of variation which can be obtained in view of selection of outputs $U_1 - U_N$ from different memories. In the embodiment shown in FIG. 2 it is, for example, possible to set N = 10 and n = 4. This implies that the number of cycles is 10 and that the information to each cycle can be fetched from four different memories. Each switch is supplied by a memory information of 2 bits. If the shift register SR in FIG. 4 has a length of 20 stages each switch can be controlled independently from the others. In the most simple case all the switches can be controlled from the same bit in the control device unit SA.

The switching between different electronic memories, memory parts or punched cards has been assumed until now to be carried out between data selectors and the logical unit (LD in FIG. 1). In certain cases it can be advantageous from the practical point of view to locate such switchings in the logical unit allowing a decreasing of the number of electronic switches.

This depends on the design of the logical unit in different ciphering systems.

In normal data transmission between different terminals special control characters are often used for giving order to connect or disconnect the receiver terminal. In ciphered transmission also special control characters are used for connecting and disconnecting of the ciphering apparatuses. The control characters which are used for giving the order to connect and disconnect the ciphering apparatus (transition from transmission in clear text to ciphering) is usually followed by outer-key-information which determines the starting positions of the cycle length counters. These control characters which are transmitted in clear text are suitably used for setting the switches to a predetermined position. The remaining control characters are transmitted in ciphered form. Thus a crypto analist who has only access to a ciphered information cannot establsih when the control characters are arriving, i.e. when the internal-key-information must be changed completely or partially. This means a considerable strengthening of the resistance of the ciphering system crypto analysis.

The control characters which are transmitted in ciphered form and give the order to change the internal-key-information may, but not necessarily, be followed by outer-key-information. In the later case a faster switching process is obtained.

Control characters intended to order change of internal-key-information can be inserted separately on the sender side, for example added by a computer or be written by a teleprinter operator. A change of the internal-key-information can also be carried out when certain characters or character combinations in a random way occur in the ciphered or deciphered text.

We claim:

1. Key generator apparatus for producing an internal key for enciphering and deciphering a message, comprising n memories each having N memory fields, a number of cycle length counters each counter being associated with all of the memory fields having the same order number in the different memories, each of said counters generating memory addresses for reading out information from the associated memory fields, a plurality of switching means having their inputs connected to said associated memory fields and having outputs and control means operated in response to a received information word for controlling said switching means to forward read out information from only one of said associated memory fields to its output in accordance with said information word, the data at said outputs of said switching means forming a key word which can be used for enciphering.

2. A key generator according to claim 1, wherein said switching means have control inputs and said control means includes a coincidence circuit, a counter and a multistage shift register, said coincidence circuit being operated by an identification word so as to start said counter which allows the shifting of information, included in a control word, in said shift register to a definite position, the stages of said shift register having outputs connected to the control inputs of said switching means for controlling the passage of information depending on the binary information in the stages of the shift register.

* * * * *